United States Patent
Huang et al.

(10) Patent No.: US 12,455,635 B2
(45) Date of Patent: Oct. 28, 2025

(54) ILLUMINATED SENSING KEY

(71) Applicant: DARFON ELECTRONICS CORP., Taoyuan (TW)

(72) Inventors: Heng-Yi Huang, Taoyuan (TW); Chun-Tan Wu, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 18/764,404

(22) Filed: Jul. 5, 2024

(65) Prior Publication Data
US 2025/0130649 A1    Apr. 24, 2025

(30) Foreign Application Priority Data

Oct. 19, 2023  (TW) ................ 112139883
Jan. 5, 2024   (TW) ................ 113100532

(51) Int. Cl.
*G06V 40/13*   (2022.01)
*G06F 3/02*    (2006.01)

(52) U.S. Cl.
CPC ........ *G06F 3/0208* (2013.01); *G06V 40/1318* (2022.01)

(58) Field of Classification Search
CPC ....................................................... G06F 3/02
See application file for complete search history.

(56) References Cited

U.S. PATENT DOCUMENTS

| | | | |
|---|---|---|---|
| 9,077,345 B2 | 7/2015 | Gourlay | |
| 9,939,920 B2* | 4/2018 | Demenschonok | .... G06F 1/1671 |
| 2018/0357459 A1* | 12/2018 | Ling | ...... G06F 3/0421 |
| 2019/0294847 A1* | 9/2019 | Chang | ............ G02B 6/0018 |
| 2022/0284726 A1* | 9/2022 | Takei | ............... G06V 10/147 |

FOREIGN PATENT DOCUMENTS

| | | |
|---|---|---|
| CN | 204204709 | 3/2015 |
| CN | 107196634 A | 9/2017 |
| CN | 209182845 | 7/2019 |
| CN | 210181625 | 3/2020 |
| CN | 111582028 | 8/2020 |
| CN | 215182049 | 12/2021 |
| TW | 201413770 A | 4/2014 |
| TW | M632311 | 9/2022 |
| TW | I791401 | 2/2023 |

* cited by examiner

*Primary Examiner* — Joseph R Haley
(74) *Attorney, Agent, or Firm* — McClure, Qualey & Rodack, LLP

(57) ABSTRACT

An illuminated touch key uses a chamfer structure of a light guide panel disposed on a sensing module or a light guide panel adjacent to a sensing module to guide light emitted by a light source to a hollow area of a keycap to emit light, thereby forming an illuminated pattern corresponding to the hollow area. Accordingly, a user can accurately find the location of the illuminated touch key according to the illuminated pattern. Since there is no need to add a light guide structure above the sensing module, the height of the illuminated touch key will not be increased, such that it is conducive to make the illuminated touch key thinner.

18 Claims, 10 Drawing Sheets

ILLUMINATED SENSING KEY

BACKGROUND OF THE INVENTION

1. Field of the Invention

The invention relates to a sensing key and, more particularly, to an illuminated sensing key.

2. Description of the Prior Art

With the development of sensing technology, sensing keys can be integrated into various electronic devices, such as keyboards, mobile devices, etc. In general, a keycap of the sensing key only has printed icons. When the sensing key is used in an environment with insufficient light, a user cannot easily find the sensing key, thereby causing inconvenience in use. Furthermore, if the sensing key is integrated into a keyboard with backlight, it is limited by the configuration of sensing module, such that the backlight can only overflow from the periphery of the keycap of the sensing key, and there is still no backlight passing through the keycap itself. If there is an icon on the top of the keycap, it still needs to be illuminated by ambient light, so the optical indication effect provided by the backlight structure is limited.

SUMMARY OF THE INVENTION

The invention provides an illuminated sensing key to solve the aforesaid problems.

According to an embodiment of the invention, an illuminated sensing key comprises a circuit board, a sensing module, a first light source, a first light guide panel and a keycap. The sensing module is disposed on the circuit board. The first light source is disposed on the circuit board. The first light guide panel is disposed on the sensing module. The first light guide panel comprises a recess and a side wall surrounding the recess. The side wall has a chamfer structure. A part of the sensing module is accommodated in the recess. The keycap is disposed on the first light guide panel. The keycap comprises a first hollow area. Light emitted by the first light source enters the first light guide panel from below the side wall and is guided by the chamfer structure to the first hollow area to emit light.

According to another embodiment of the invention, an illuminated sensing key comprises a circuit board, a sensing module, a first light source, a first light guide panel and a keycap. The sensing module is disposed on the circuit board. The first light source is disposed on the circuit board. The first light guide panel is disposed on the sensing module. The first light guide panel comprises a top portion, a side wall and a chamfer structure. The chamfer structure is located between the top portion and the side wall. The side wall is connected to the top portion and extends to be close to the circuit board to form light conduction with the first light source. The keycap is disposed on the first light guide panel. The top portion of the first light guide panel is disposed between the keycap and the sensing module. The keycap comprises a first hollow area. A vertical projection of the first hollow area overlaps with the top portion of the first light guide panel and the sensing module. The vertical projection of the first hollow area does not overlap with the first light source. Light emitted by the first light source enters the first light guide panel from below the side wall and is guided by the chamfer structure to the first hollow area to emit light.

According to another embodiment of the invention, an illuminated sensing key comprises a circuit board, a sensing module, a light guide panel, a light source and a keycap. The sensing module is disposed on the circuit board. The light guide panel is disposed on the circuit board and adjacent to the sensing module. The light source is disposed on the circuit board. The keycap is disposed on the sensing module and the light guide panel. The keycap comprises a hollow area. Light emitted by the light source enters the light guide panel from a side of the light guide panel and is guided by the light guide panel to the hollow area to emit light.

As mentioned in the above, the invention uses a chamfer structure of a light guide panel disposed on a sensing module or a light guide panel adjacent to a sensing module to guide light emitted by a light source to a hollow area of a keycap to emit light, thereby forming an illuminated pattern corresponding to the hollow area. In an embodiment, the invention disposes the first light guide panel on the sensing module and the side wall forms light conduction with the first light source. Thus, the light emitted by the first light source is able to enter the first light guide panel from below the side wall and is guided by the chamfer structure to the first hollow area to emit light, so as to form an illuminated pattern corresponding to the first hollow area. Accordingly, a user can accurately find the illuminated sensing key according to the illuminated pattern. In another embodiment, the invention uses the light guide panel adjacent to the sensing module to guide light. Since the light guide panel is adjacent to the sensing module, the light guide panel does not increase the height of the illuminated sensing key, such that it is conducive to make the illuminated sensing key thinner.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
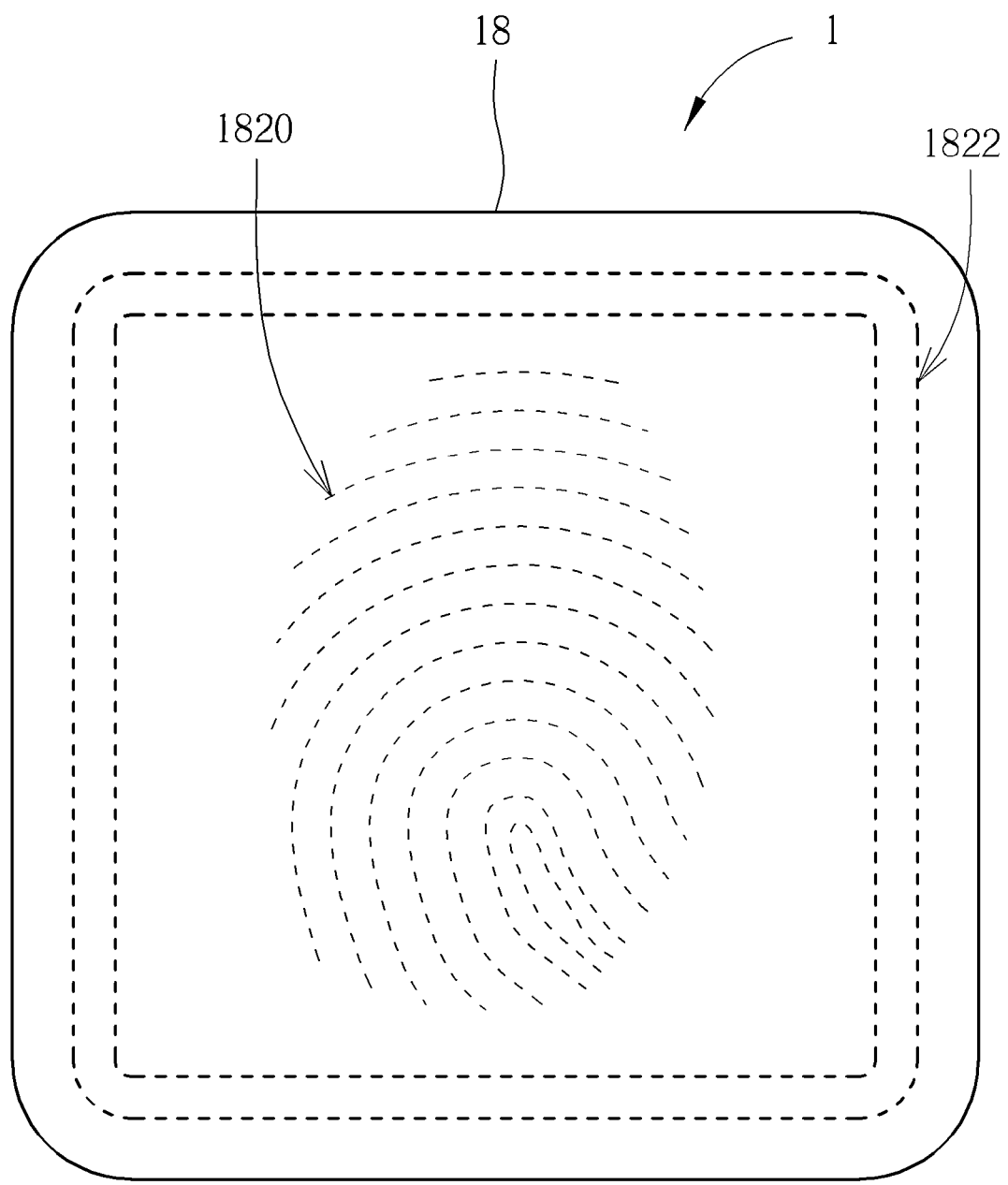
FIG. 1 is a top view illustrating an illuminated sensing key according to an embodiment of the invention.
Figure 2:
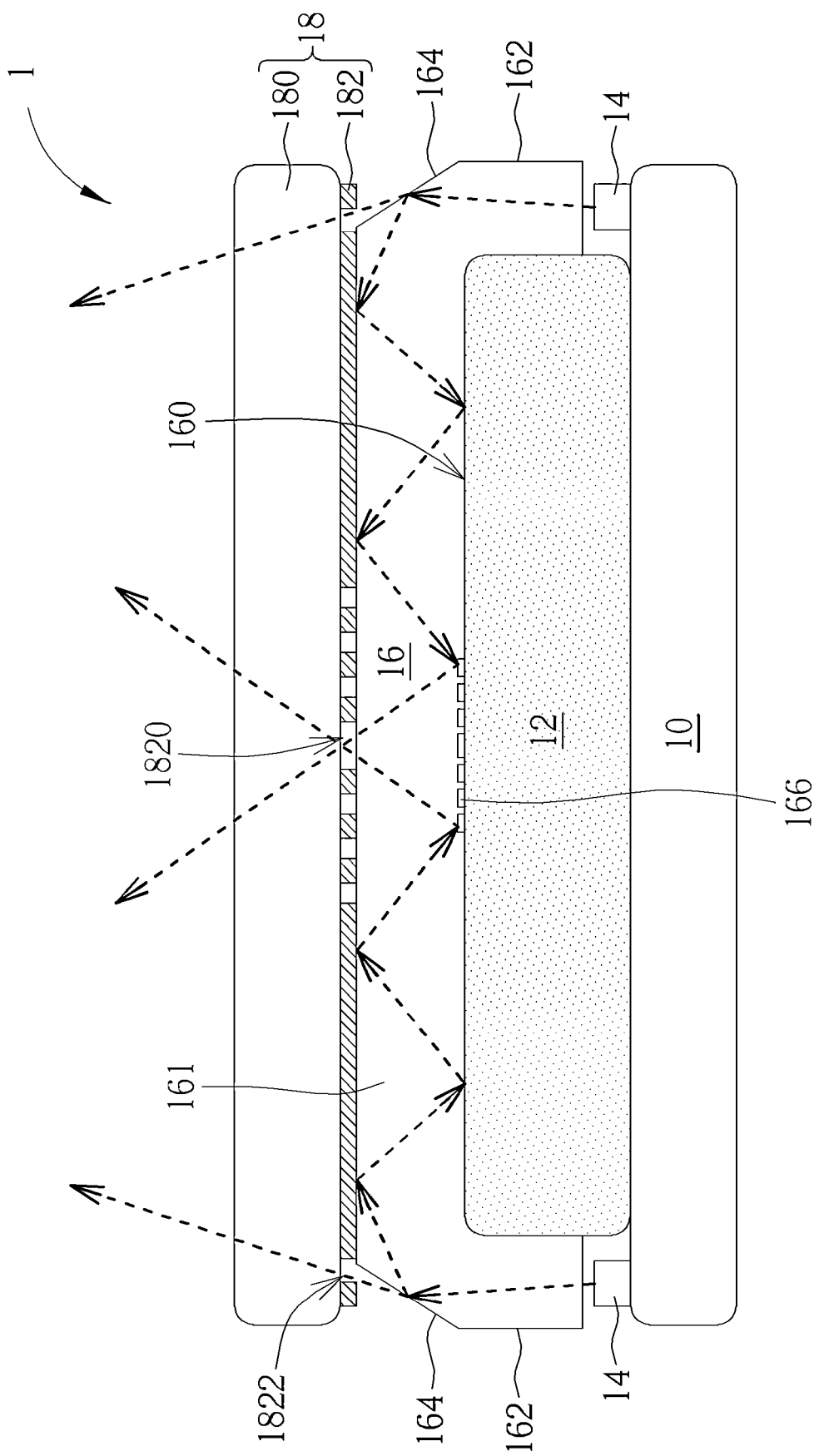
FIG. 2 is a sectional view illustrating the illuminated sensing key shown in FIG. 1.

Referring to FIGS. 1 and 2, FIG. 1 is a top view illustrating an illuminated sensing key 1 according to an embodiment of the invention, and FIG. 2 is a sectional view illustrating the illuminated sensing key 1 shown in FIG. 1. In order to clearly show the light path, the section line is not illustrated in FIG. 2.

As shown in FIGS. 1 and 2, the illuminated sensing key 1 comprises a circuit board 10, a sensing module 12, a first light source 14, a first light guide panel 16 and a keycap 18. The circuit board 10 may be a printed circuit board (PCB) or other circuit boards capable of providing electrical connection, wherein the circuit board 10 may comprise a substrate and sensing circuits on the substrate. The sensing module 12 and the first light source 14 are disposed on the circuit board 10, so as to control operations of the sensing module 12 and the first light source 14 through the circuit board 10. The sensing module 12 is electrically connected to the sensing circuits of the circuit board 10, generates sensing signals according to user operation, and outputs the sensing signals to a system end (e.g. computer) through the sensing circuits. In practical applications, the sensing module 12 may comprise an integrated circuit (IC) die and a package covering the IC die. The sensing module 12 may comprise one or any combination of a fingerprint recognition module and any type of touch module. The first light source 14 may be a light emitting diode (LED) or other components capable of emitting light.

The first light guide panel 16 is disposed on the package of the sensing module 12. The first light guide panel 16 comprises a recess 160 and a side wall 162 surrounding the recess 160, such that a cross-section of the first light guide panel 16 is U-shaped. Thus, in a perspective view, the first light guide panel 16 is bowl-shaped. The side wall 162 has a chamfer structure 164. The first light guide panel 16 may be manufactured by injection molding. A part of the sensing module 12 is accommodated in the recess 160 of the first light guide panel 16, such that the side wall 162 of the first light guide panel 16 surrounds the sensing module 12. In this embodiment, the first light source 14 may be disposed below the side wall 162 of the first light guide panel 16. For further explanation, the first light guide panel 16 may comprise a top portion 161, a side wall 162 and the chamfer structure 164, wherein the chamfer structure 164 is located between the top portion 161 and the side wall 162. The side wall 162 is connected to the top portion 161 and extends to be close to the circuit board 10 to form light conduction with the first light source 14, such that light emitted by the first light source 14 enters the first light guide panel 16 from below the side wall 162. It should be noted that the number of first light sources 14 may be determined according to practical applications, so the invention is not limited to the embodiment shown in the figure.

The keycap 18 is disposed on the first light guide panel 16, wherein the top portion 161 of the first light guide panel 16 is disposed between the keycap 18 and the sensing module 12, and the chamfer structure 164 of the first light guide panel 16 is adjacent to the keycap 18. The keycap 18 comprises a light transmitting layer 180 and a light shielding layer 182, wherein the light shielding layer 182 is disposed at a side of the light transmitting layer 180. In this embodiment, the light shielding layer 182 may be disposed at a side of the light transmitting layer 180 facing the circuit board 10. In another embodiment, the light shielding layer 182 may also be disposed at another side of the light transmitting layer 180 away from the circuit board 10. In other words, the light shielding layer 182 may be disposed at one of two opposite sides of the light transmitting layer 180 according to practical applications. The light transmitting layer 180 may be glass, polycarbonate (PC) or other light transmitting plates. The light shielding layer 182 may be ink or other light shielding materials formed on the light transmitting layer 180 through printing or other manners.

The light shielding layer 182 has a first hollow area 1820 and a second hollow area 1822, wherein the second hollow area 1822 is located at a periphery of the first hollow area 1820. In this embodiment, the first hollow area 1820 may form a pattern corresponding to a sensing function of the sensing module 12. For example, when the sensing module 12 is a fingerprint recognition module, the first hollow area 1820 may form a fingerprint pattern. Thus, when the light is emitted from the first hollow area 1820, an illuminated fingerprint pattern is shown. Furthermore, in this embodiment, the second hollow area 1822 may be ring-shaped. Thus, when the light is emitted from the second hollow area 1822, a ring-shaped halo is shown. It should be noted that the patterns and shapes of the first hollow area 1820 and the second hollow area 1822 may be determined according to practical applications, so the invention is not limited to the aforesaid embodiment. In this embodiment, the first light guide panel 16 may further comprise a micro-structure 166, wherein a position of the micro-structure 166 corresponds to a position of the first hollow area 1820. The micro-structure 166 is located at a side adjacent to the sensing module 12 and configured to reflect light toward the first hollow area 1820.

In this embodiment, a vertical projection of the first hollow area 1820 overlaps with the top portion 161 of the first light guide panel 16 and the sensing module 12, and the vertical projection of the first hollow area 1820 does not overlap with the first light source 14. Thus, the light emitted by the first light source 14 cannot be directly emitted from the first hollow area 1820.

As shown in FIG. 2, light emitted by the first light source 14 enters the first light guide panel 16 from below the side wall 162 of the first light guide panel 16 and is guided by the chamfer structure 164 to the first hollow area 1820 of the keycap 18 to emit light. In this embodiment, the vertical projection of the first hollow area 1820 does not overlap with the side wall 162 of the first light guide panel 16. Thus, after the light enters the first light guide panel 16 from below the side wall 162 of the first light guide panel 16, the chamfer structure 164 will reflect the light toward the first hollow area 1820. Then, the light is reflected by the micro-structure 166 toward the first hollow area 1820, such that the light is emitted from the first hollow area 1820 to form an illuminated pattern (e.g. illuminated fingerprint pattern) corresponding to the first hollow area 1820. Accordingly, a user can accurately find the illuminated sensing key 1 according to the illuminated pattern.

Furthermore, after the light emitted by the first light source 14 enters the first light guide panel 16 from below the side wall 162 of the first light guide panel 16, the light will be refracted by the chamfer structure 164 to the second hollow area 1822 of the keycap 18 to emit light, so as to form an illuminated effect (e.g. halo) corresponding to the second hollow area 1822. Accordingly, the invention can provide the user with richer visual effect.

In this embodiment, the chamfer structure 164 is an inclined surface. The invention may adjust an inclined angle of the inclined surface to adjust the amount of light emitted from the first hollow area 1820 and the second hollow area 1822.

Figure 3:
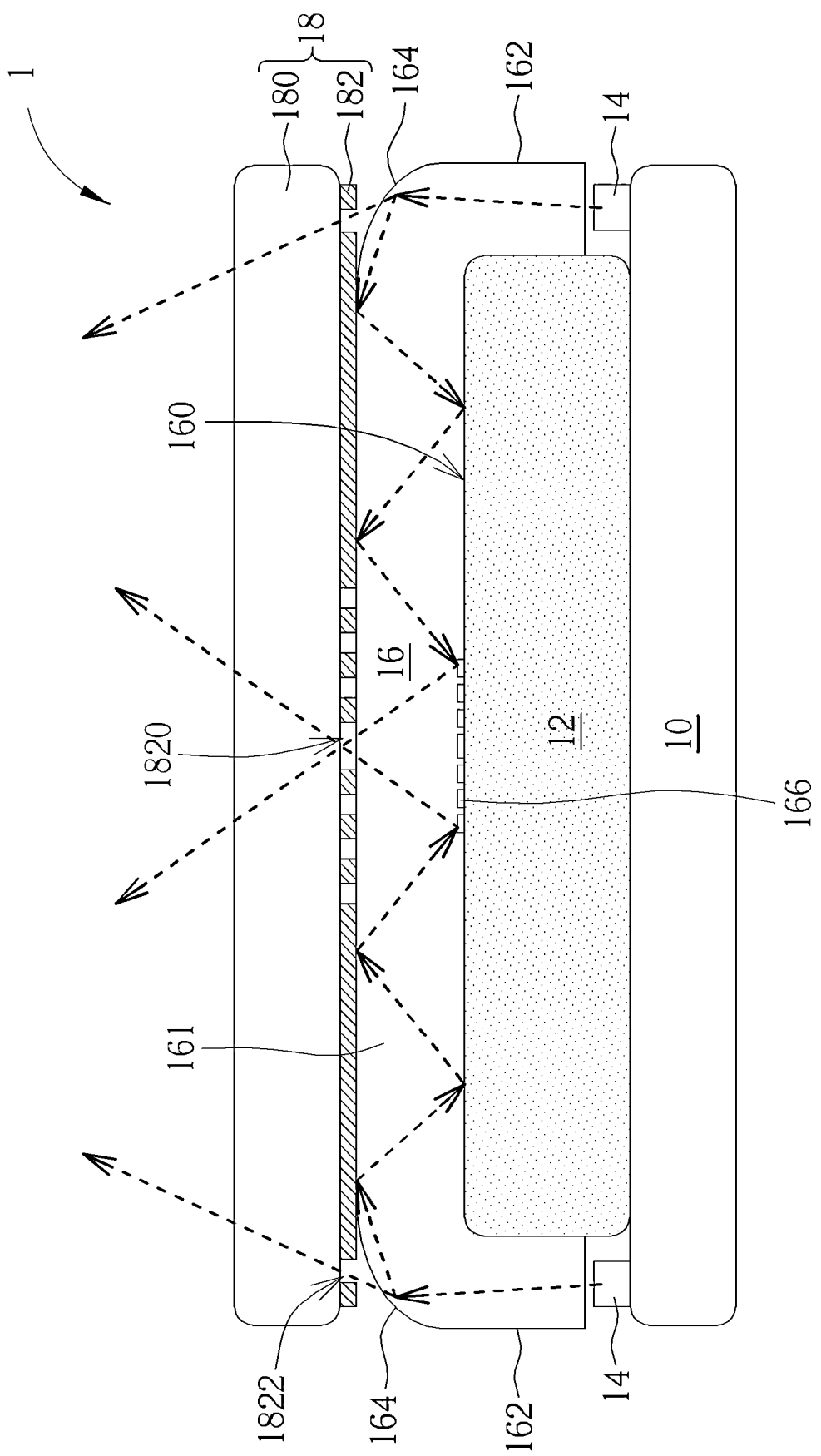
FIG. 3 is a sectional view illustrating the illuminated sensing key according to another embodiment of the invention.

Referring to FIG. 3, FIG. 3 is a sectional view illustrating the illuminated sensing key 1 according to another embodiment of the invention. In order to clearly show the light path, the section line is not illustrated in FIG. 3.

As shown in FIG. 3, the chamfer structure 164 may be a curved surface composed of at least one radian. In an embodiment, the chamfer structure 164 may be an arc surface composed of one single radian. In another embodiment, the chamfer structure 164 may be an irregular curved surface composed of a plurality of radians. The invention may adjust the radian of the curved surface to adjust the amount of light emitted from the first hollow area 1820 and the second hollow area 1822, such that the amount of light emitted from the first hollow area 1820 is larger than, equal to, or smaller than the amount of light emitted from the second hollow area 1822.

Figure 4:
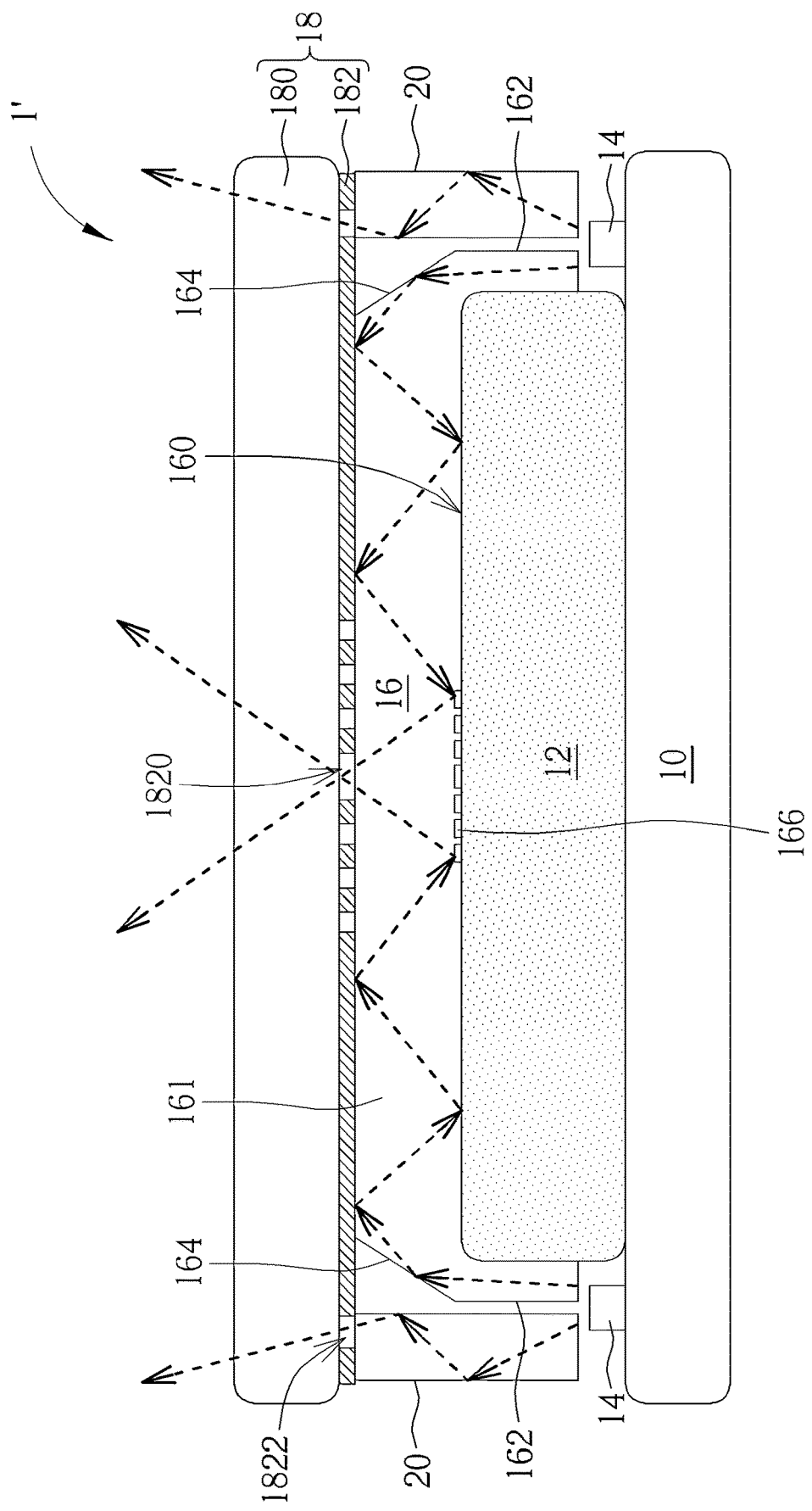
FIG. 4 is a sectional view illustrating an illuminated sensing key according to another embodiment of the invention.

Referring to FIG. 4, FIG. 4 is a sectional view illustrating an illuminated sensing key 1' according to another embodiment of the invention. In order to clearly show the light path, the section line is not illustrated in FIG. 4.

The main difference between the illuminated sensing key 1' and the aforesaid illuminated sensing key 1 is that the illuminated sensing key 1' further comprises a second light guide panel 20, as shown in FIG. 4. In this embodiment, the second light guide panel 20 is disposed below the keycap 18, and a position of the second light guide panel 20 corresponds to a position of the second hollow area 1822. A shape of the second light guide panel 20 also corresponds to a shape of the second hollow area 1822. For example, if the second hollow area 1822 is ring-shaped, the second light guide panel 20 is also ring-shaped. The first light source 14 may be disposed below the side wall 162 of the first light guide panel 16 and the second light guide panel 20, such that light emitted by the first light source 14 enters the first light guide panel 16 from below the side wall 162 and enters the second light guide panel 20 from below the second light guide panel 20.

After the light emitted by the first light source 14 enters the first light guide panel 16 from below the side wall 162 of the first light guide panel 16, the light will be guided by the chamfer structure 164 to the first hollow area 1820 of the keycap 18 to emit light, so as to form an illuminated pattern (e.g. illuminated fingerprint pattern) corresponding to the first hollow area 1820. Furthermore, after the light emitted by the first light source 14 enters the second light guide panel 20 from below the second light guide panel 20, the light will be guided by the second light guide panel 20 to the second hollow area 1822 to emit light, so as to form an illuminated effect (e.g. halo) corresponding to the second hollow area 1822. By guiding the light to the second hollow area 1822 through the second light guide panel 20, the light emitted from the second hollow area 1822 may be more concentrated, thereby enhancing the illuminated effect of the second hollow area 1822.

In this embodiment, the vertical projection of the first hollow area 1820 does not overlap with the second light guide panel 20. Thus, the second light guide panel 20 will not guide the light to the first hollow area 1820. In addition, the vertical projection of the second hollow area 1822 does not overlap with the sensing module 12, and the vertical projection of the second hollow area 1822 overlaps with the second light guide panel 20. Thus, the second light guide panel 20 can guide the light to the second hollow area 1822.

Figure 5:
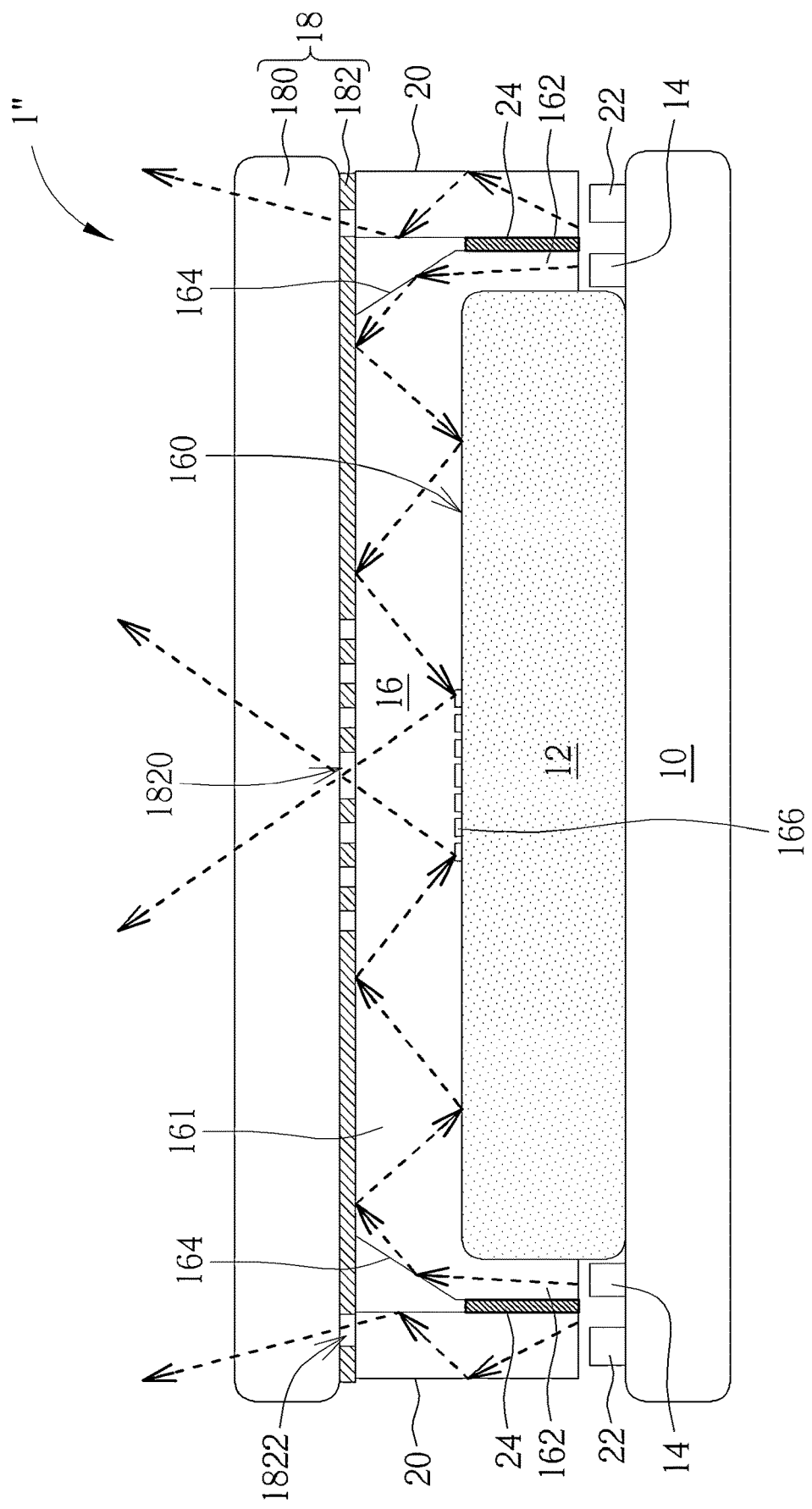
FIG. 5 is a sectional view illustrating an illuminated sensing key according to another embodiment of the invention.

Referring to FIG. 5, FIG. 5 is a sectional view illustrating an illuminated sensing key 1" according to another embodiment of the invention. In order to clearly show the light path, the section line is not illustrated in FIG. 5.

The main difference between the illuminated sensing key 1' and the aforesaid illuminated sensing key 1' is that the illuminated sensing key 1" further comprises a second light source 22, as shown in FIG. 5. In this embodiment, the first light source 14 may be disposed below the side wall 162 of the first light guide panel 16, and the second light source 22 may be disposed below the second light guide panel 20, such that light emitted by the first light source 14 enters the first light guide panel 16 from below the side wall 162, and light emitted by the second light source 22 enters the second light guide panel 20 from below the second light guide panel 20. It should be noted that the number of first light sources 14 and second light sources 22 may be determined according to practical applications, so the invention is not limited to the embodiment shown in the figure.

After the light emitted by the first light source 14 enters the first light guide panel 16 from below the side wall 162 of the first light guide panel 16, the light will be guided by the chamfer structure 164 to the first hollow area 1820 of the keycap 18 to emit light, so as to form an illuminated pattern (e.g. illuminated fingerprint pattern) corresponding to the first hollow area 1820. Furthermore, after the light emitted by the second light source 22 enters the second light guide panel 20 from below the second light guide panel 20, the light will be guided by the second light guide panel 20 to the second hollow area 1822 to emit light, so as to form an illuminated effect (e.g. halo) corresponding to the second hollow area 1822. Since the first light source 14 and the second light source 22 are two independent light sources, the first light source 14 and the second light source 22 may be controlled independently, so as to emit light from the first hollow area 1820 and the second hollow area 1822 individually or simultaneously.

In this embodiment, the vertical projection of the second hollow area 1822 overlaps with the second light guide panel 20 and the second light source 22. Thus, the second light guide panel 20 can guide the light emitted by the second light source 22 to the second hollow area 1822.

As shown in FIG. 5, the illuminated sensing key 1" may further comprise a light blocking member 24, wherein the light blocking member 24 is disposed between the side wall 162 of the first light guide panel 16 and the second light guide panel 20. The light blocking member 24 may be a light absorbing component (e.g. black sponge, black mask, etc.), so as to prevent the light emitted by the first light source 14 and the second light source 22 from interfering with each other.

Figure 6:
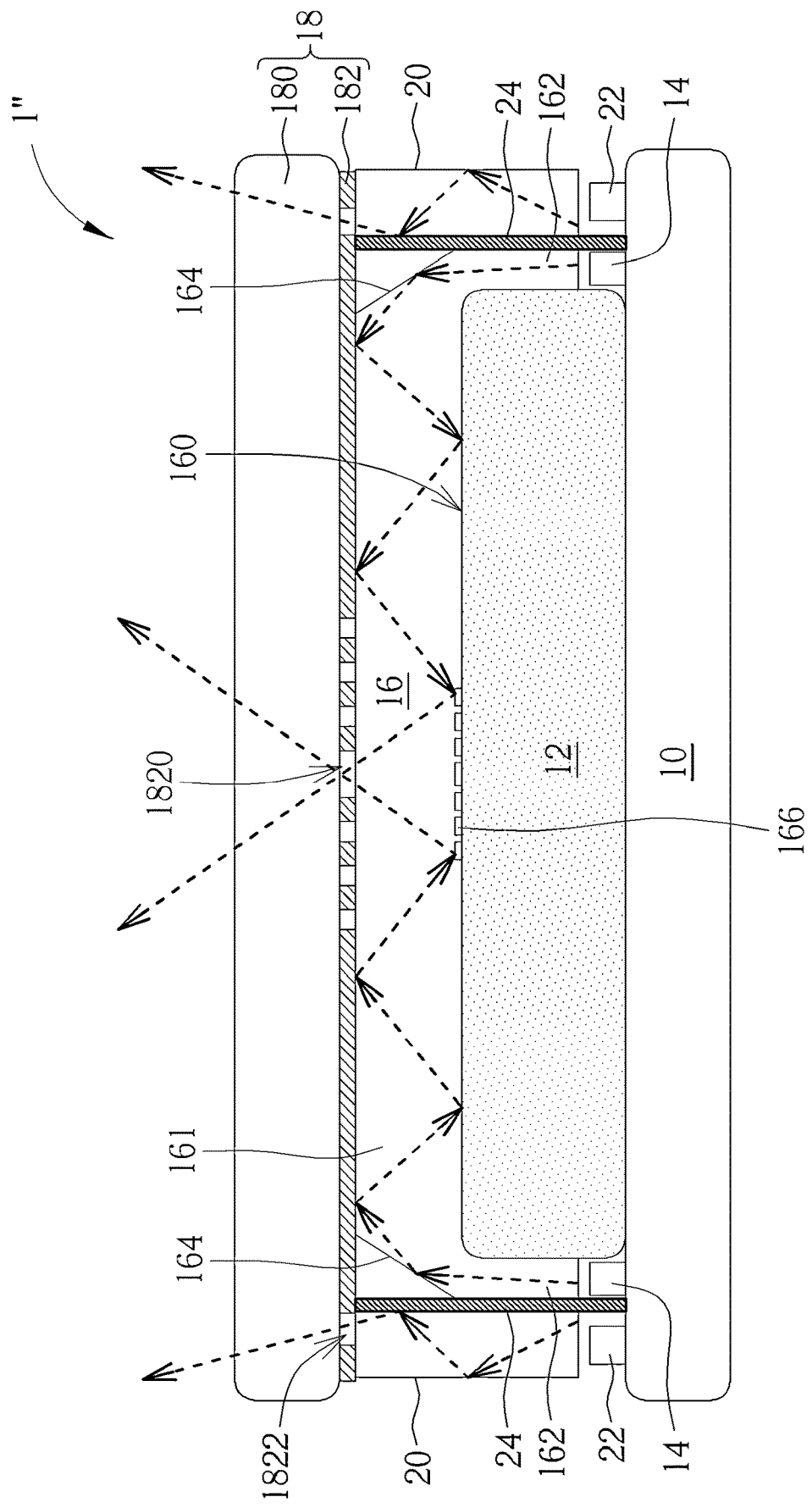
FIG. 6 is a sectional view illustrating the illuminated sensing key according to another embodiment of the invention.

Referring to FIG. 6, FIG. 6 is a sectional view illustrating the illuminated sensing key 1" according to another embodiment of the invention. In order to clearly show the light path, the section line is not illustrated in FIG. 6.

As shown in FIG. 6, the light blocking member 24 may extend to a lower surface of the keycap 18 and may also extend to an upper surface of the circuit board 10, so as to improve the effect of blocking light interference. It should be noted that the light blocking member 24 may only extend to the lower surface of the keycap 18 or may only extend to the upper surface of the circuit board 10 according to practical applications.

In another embodiment, the sensing module 12 may have four sides, and the side wall 162 of the first light guide panel 16 extends along at least one of the four sides of the sensing module 12 to be close to the first light source 14. At this time, the light blocking member 24 may surround the other side(s) of the sensing module 12 where the side wall 162 does not extend to, so as to prevent the light from leaking from the other side(s) of the sensing module 12.

Figure 7:
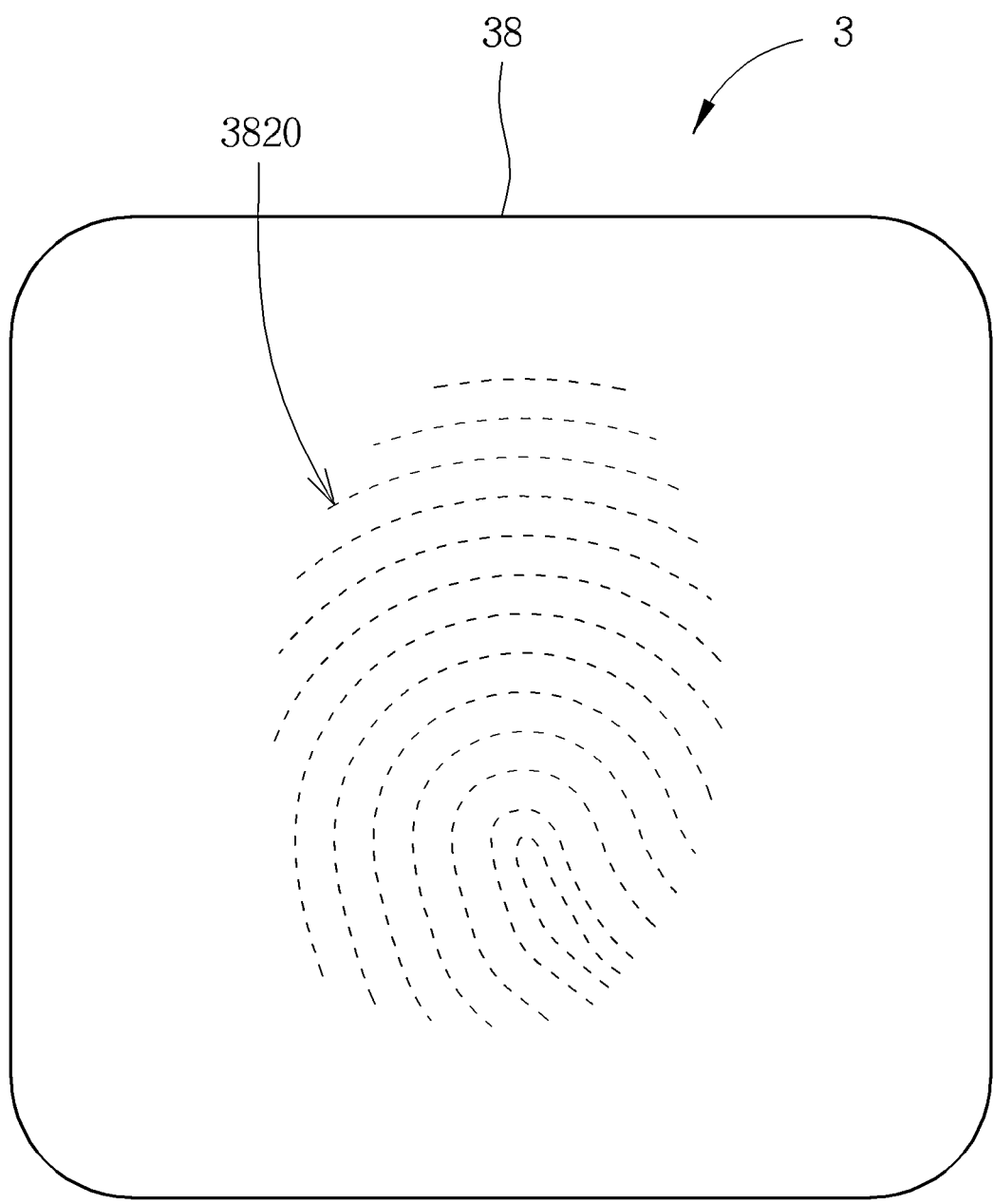
FIG. 7 is a top view illustrating an illuminated sensing key according to another embodiment of the invention.
Figure 8:
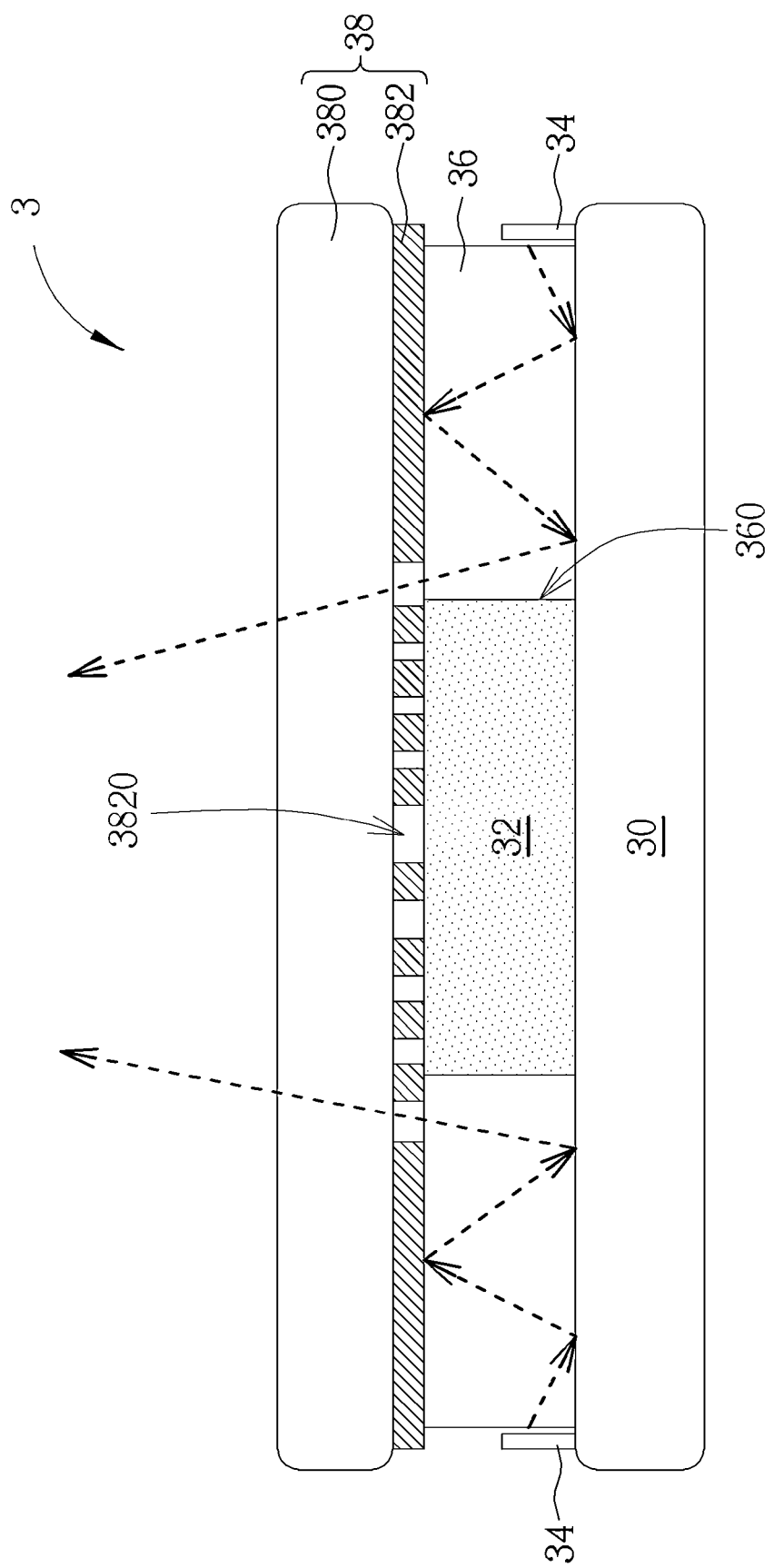
FIG. 8 is a sectional view illustrating the illuminated sensing key shown in FIG. 7.

Referring to FIGS. 7 and 8, FIG. 7 is a top view illustrating an illuminated sensing key 3 according to another embodiment of the invention, and FIG. 8 is a sectional view illustrating the illuminated sensing key 3 shown in FIG. 7. In order to clearly show the light path, the section line is not illustrated in FIG. 8.

As shown in FIGS. 7 and 8, the illuminated sensing key 3 comprises a circuit board 30, a sensing module 32, a light source 34, a light guide panel 36 and a keycap 38. The circuit board 30 may be a printed circuit board (PCB) or other circuit boards capable of providing electrical connection, wherein the circuit board 30 may comprise a substrate and sensing circuits on the substrate. The sensing module 32 and the light source 34 are disposed on the circuit board 30, so as to control operations of the sensing module 32 and the light source 34 through the circuit board 30. The sensing module 32 is electrically connected to the sensing circuits of the circuit board 30, generates sensing signals according to user operation, and outputs the sensing signals to a system end (e.g. computer) through the sensing circuits. In practical applications, the sensing module 32 may comprise an integrated circuit (IC) die and a package covering the IC die. The sensing module 32 may comprise one or any combination of a fingerprint recognition module and any type of touch module. The light source 34 may be a light emitting diode (LED) or other components capable of emitting light.

The light guide panel 36 is disposed on the circuit board 30 and adjacent to the sensing module 32. In this embodiment, the light guide panel 36 may have a hole 360 and the sensing module 32 may be disposed in the hole 360, such that the light guide panel 36 is adjacent to the sensing module 32. The light source 34 is located at a side of the light guide panel 36, such that light emitted by the light source 34 enters the light guide panel 36 from the side of the light guide panel 36. It should be noted that the number of light sources 34 may be determined according to practical applications, so the invention is not limited to the embodiment shown in the figure.

The keycap 38 is disposed on the sensing module 32 and the light guide panel 36. In this embodiment, the light guide panel 36 is flush with the sensing module 32, such that the keycap 38 may be flatly attached to the sensing module 32 and the light guide panel 36. The keycap 38 comprises a light transmitting layer 380 and a light shielding layer 382, wherein the light shielding layer 382 is disposed at a side of the light transmitting layer 380. In this embodiment, the light shielding layer 382 may be disposed at a side of the light transmitting layer 380 facing the circuit board 30. In another embodiment, the light shielding layer 382 may also be disposed at another side of the light transmitting layer 380 away from the circuit board 30. In other words, the light shielding layer 382 may be disposed at one of two opposite sides of the light transmitting layer 380 according to practical applications. The light transmitting layer 380 may be glass, polycarbonate (PC) or other light transmitting plates. The light shielding layer 382 may be ink or other light shielding materials formed on the light transmitting layer 380 through printing or other manners.

The light shielding layer 382 has a hollow area 3820. In this embodiment, the hollow area 3820 may form a pattern corresponding to a sensing function of the sensing module 32. For example, when the sensing module 32 is a fingerprint recognition module, the hollow area 3820 may form a fingerprint pattern. Thus, when the light is emitted from the hollow area 3820, an illuminated fingerprint pattern is shown. It should be noted that the pattern and shape of the hollow area 3820 may be determined according to practical applications, so the invention is not limited to the aforesaid embodiment.

As shown in FIG. 8, light emitted by the light source 34 enters the light guide panel 36 from a side of the light guide panel 36 and is guided by the light guide panel 36 to the hollow area 3820 of the keycap 38 to emit light, so as to form an illuminated pattern (e.g. illuminated fingerprint pattern) corresponding to the hollow area 3820. Accordingly, a user can accurately find the illuminated sensing key 3 according to the illuminated pattern. In this embodiment, since the light guide panel 36 is adjacent to the sensing module 32, the light guide panel 36 does not increase the height of the illuminated sensing key 3, such that it is conducive to make the illuminated sensing key 3 thinner.

Figure 9:
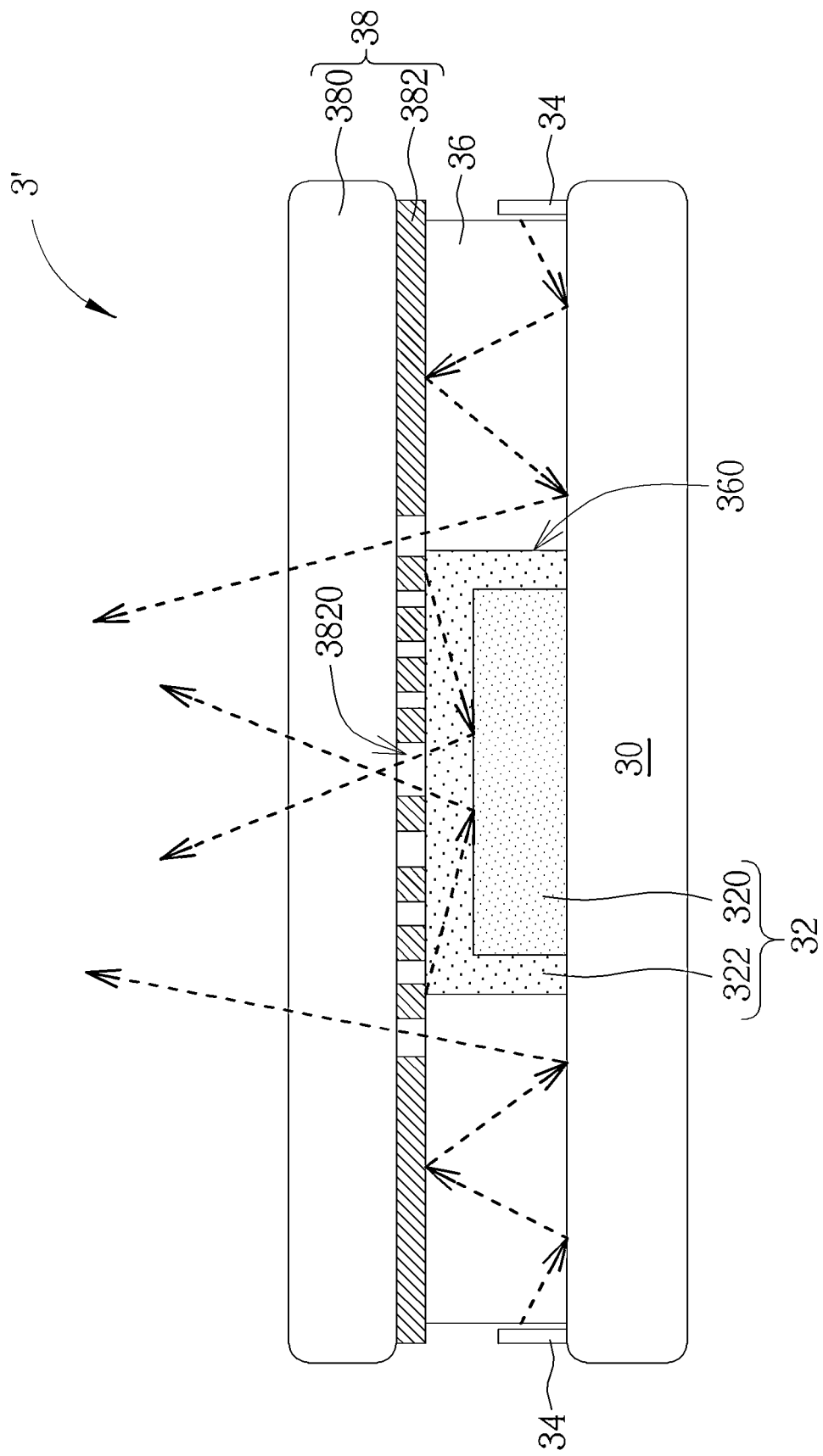
FIG. 9 is a sectional view illustrating an illuminated sensing key according to another embodiment of the invention.

Referring to FIG. 9, FIG. 9 is a sectional view illustrating an illuminated sensing key 3' according to another embodiment of the invention. In order to clearly show the light path, the section line is not illustrated in FIG. 9.

As shown in FIG. 9, the sensing module 32 of the illuminated sensing key 3' comprises a sensing die 320 and a transparent package material 322, wherein the sensing die 320 is packaged in the transparent package material 322. Thus, the light emitted by the light source 34 may be further transmitted to the transparent package material 322 through the light guide panel 36 and guided by the transparent package material 322 to the hollow area 3820 of the keycap 38 to emit light. Accordingly, the invention can avoid the dark area above the sensing module 32 due to the inability of light to reach, and increase the amount of light emitted from the hollow area 3820.

Figure 10:
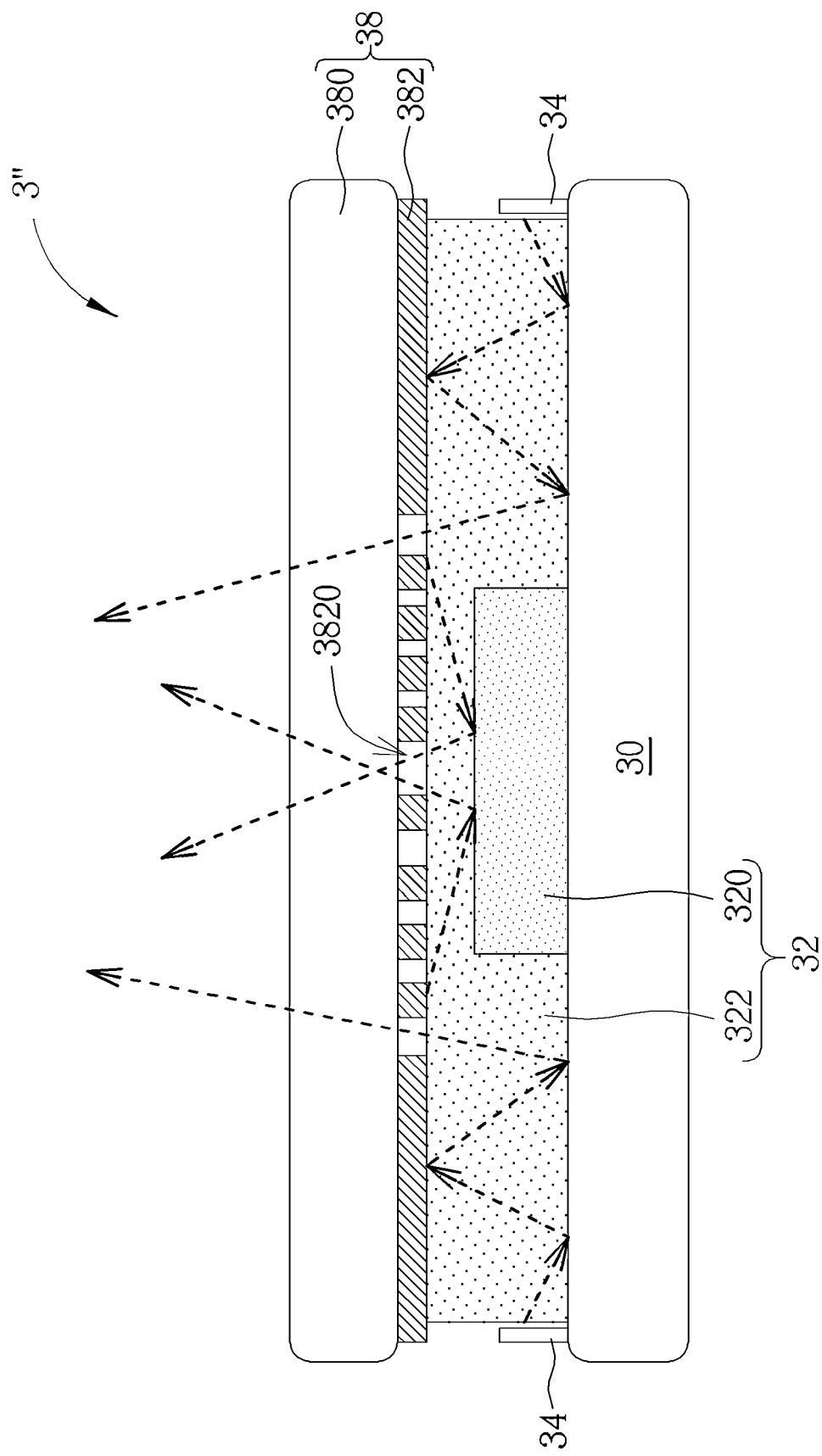
FIG. 10 is a sectional view illustrating an illuminated sensing key according to another embodiment of the invention.

Referring to FIG. 10, FIG. 10 is a sectional view illustrating an illuminated sensing key 3" according to another embodiment of the invention. In order to clearly show the light path, the section line is not illustrated in FIG. 10.

The main difference between the illuminated sensing key 3" and the aforesaid illuminated sensing key 3' is that the illuminated sensing key 3" omits the aforesaid light guide panel 36 and extends the size of the transparent package material 322 of the sensing module 32 to be close to the light source 34, as shown in FIG. 10. Thus, light emitted by the light source 34 enters the transparent package material 322 from a side of the transparent package material 322 and is guided by the transparent package material 322 to the hollow area 3820 of the keycap 38 to emit light, so as to form an illuminated pattern (e.g. illuminated fingerprint pattern) corresponding to the hollow area 3820. Accordingly, a user can accurately find the illuminated sensing key 3" according to the illuminated pattern. In this embodiment, since there is no need to add a light guide structure above the sensing module 32, the height of the illuminated sensing key 3" will not be increased, such that it is conducive to make the illuminated sensing key 3" thinner.

In this embodiment, since there is no need to add a light guide structure above the sensing module 32, the height of the illuminated sensing key 3" will not be increased, such that it is conductive to make the illuminated sensing key 3" thinner.

It should be noted that the same elements in FIG. 4 and FIGS. 1-3 are represented by the same numerals, so the repeated explanation will not be depicted herein again.

Furthermore, according to practical applications, a plurality of sensing modules 32 may be disposed on the circuit board 30, wherein the plurality of sensing modules 32 may correspond to a single hollow area 3820. For example, the plurality of sensing modules 32 may be fingerprint recognition modules, and each of the sensing modules 32 may be used to recognize a part of a single fingerprint. At this time, the hollow area 3820 is a fingerprint pattern.

As mentioned in the above, the invention uses a chamfer structure of a light guide panel disposed on a sensing module or a light guide panel adjacent to a sensing module to guide light emitted by a light source to a hollow area of a keycap to emit light, thereby forming an illuminated pattern corresponding to the hollow area. In an embodiment, the invention disposes the first light guide panel on the sensing module and the side wall forms light conduction with the first light source. Thus, the light emitted by the first light source is able to enter the first light guide panel from below the side wall and is guided by the chamfer structure to the first hollow area to emit light, so as to form an illuminated pattern corresponding to the first hollow area. Accordingly, a user can accurately find the illuminated sensing key according to the illuminated pattern. Furthermore, the invention may use the first light guide panel or the second light guide panel to guide light to the second hollow area to emit light, so as to form an illuminated effect corresponding to the second hollow area. Accordingly, the invention can provide the user with richer visual effect. In another embodiment, the invention uses the light guide panel adjacent to the sensing module to guide light. Since the light guide panel is adjacent to the sensing module, the light guide panel does not increase the height of the illuminated sensing key, such that it is conducive to make the illuminated sensing key thinner. In another embodiment, the invention uses the transparent package material of the sensing module to guide light. Since there is no need to add a light guide structure above the sensing module, the height of the illuminated sensing key will not be increased, such that it is conducive to make the illuminated sensing key thinner.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An illuminated sensing key comprising:
    a circuit board;
    a sensing module disposed on the circuit board;
    a first light source disposed on the circuit board;
    a first light guide panel disposed on the sensing module, the first light guide panel comprising a top portion, a recess and a side wall connected to the top portion and surrounding the recess, the side wall having a chamfer structure, a part of the sensing module being accommodated in the recess; and
    a keycap disposed on the first light guide panel, the keycap comprising a first hollow area, a vertical projection of the first hollow area overlapping with the top portion of the first light guide panel and the sensing module, the vertical projection of the first hollow area not overlapping with the first light source;
    wherein light emitted by the first light source enters the first light guide panel from below the side wall and is guided by the chamfer structure to the first hollow area to emit light.

2. The illuminated sensing key of claim 1, wherein the keycap further comprises a second hollow area, the second hollow area is located at a periphery of the first hollow area, and the light emitted by the first light source enters the first light guide panel from below the side wall and is guided by the chamfer structure to the second hollow area to emit light.

3. The illuminated sensing key of claim 1, wherein the keycap further comprises a second hollow area, the second hollow area is located at a periphery of the first hollow area, the illuminated sensing key further comprises a second light guide panel, the second light guide panel is disposed below the keycap, a position of the second light guide panel corresponds to a position of the second hollow area, and the light emitted by the first light source enters the second light guide panel from below the second light guide panel and is guided by the second light guide panel to the second hollow area to emit light.

4. The illuminated sensing key of claim 1, wherein the keycap further comprises a second hollow area, the second hollow area is located at a periphery of the first hollow area, the illuminated sensing key further comprises a second light source and a second light guide panel, the second light source is disposed on the circuit board, the second light guide panel is disposed below the keycap, a position of the second light guide panel corresponds to a position of the second hollow area, and light emitted by the second light source enters the second light guide panel from below the second light guide panel and is guided by the second light guide panel to the second hollow area to emit light.

5. The illuminated sensing key of claim 1, wherein the keycap further comprises a second hollow area, the second hollow area is located at a periphery of the first hollow area, the illuminated sensing key further comprises a second light guide panel and a light blocking member, the second light guide panel is disposed below the keycap, a position of the second light guide panel corresponds to a position of the second hollow area, and the light blocking member is disposed between the side wall of the first light guide panel and the second light guide panel.

6. The illuminated sensing key of claim 5, wherein the light blocking member extends to a lower surface of the keycap.

7. The illuminated sensing key of claim 5, wherein the light blocking member extends to an upper surface of the circuit board.

8. The illuminated sensing key of claim 3, wherein the vertical projection of the first hollow area does not overlap with the second light guide panel.

9. The illuminated sensing key of claim 2, wherein a vertical projection of the second hollow area does not overlap with the sensing module.

10. The illuminated sensing key of claim 4, wherein a vertical projection of the second hollow area overlaps with the second light guide panel and the second light source.

11. The illuminated sensing key of claim 1, wherein the chamfer structure is an inclined surface.

12. The illuminated sensing key of claim 1, wherein the chamfer structure is a curved surface composed of at least one radian.

13. The illuminated sensing key of claim 1, wherein the first light guide panel further comprises a micro-structure, and a position of the micro-structure corresponds to a position of the first hollow area.

14. An illuminated sensing key comprising:
    a circuit board;
    a sensing module disposed on the circuit board;
    a first light source disposed on the circuit board;
    a first light guide panel disposed on the sensing module, the first light guide panel comprising a top portion, a side wall and a chamfer structure, the chamfer structure being located between the top portion and the side wall, the side wall being connected to the top portion and extending to be close to the circuit board to form light conduction with the first light source; and a keycap disposed on the first light guide panel, the top portion of the first light guide panel being disposed between the keycap and the sensing module, the keycap comprising a first hollow area, a vertical projection of the first hollow area overlapping with the top portion of the first light guide panel and the sensing module, the vertical projection of the first hollow area not overlapping with the first light source;

wherein light emitted by the first light source enters the first light guide panel from below the side wall and is guided by the chamfer structure to the first hollow area to emit light.

15. The illuminated sensing key of claim 14, wherein the vertical projection of the first hollow area does not overlap with the side wall of the first light guide panel.

16. An illuminated sensing key comprising:

a circuit board;

a sensing module disposed on the circuit board, the sensing module comprising a sensing die and a transparent package material, the sensing die packaged under a top part of the transparent package material;

a light guide panel disposed on the circuit board and adjacent to the sensing module, the light guide panel having a sidewall surrounding the sensing die;

a light source disposed on the circuit board; and a keycap disposed on the sensing module and the light guide panel, the keycap comprising a hollow area, a vertical projection of the hollow area overlapping with the top part of the transparent package material and the sensing die, so that the top part of the transparent package material is disposed between the sensing die and the keycap, the vertical projection of the hollow area not overlapping with the light source nor the light guide panel;

wherein light emitted by the light source enters the light guide panel from a side of the light guide panel and is guided by the light guide panel and the top part of the transparent package material to the hollow area to emit light.

17. The illuminated sensing key of claim 16, wherein the top part of the transparent package material is aligned with a top of the sidewall of the light guide panel.

18. The illuminated sensing key of claim 16, wherein the light guide panel has a hole and the sensing module is disposed in the hole.

* * * * *